United States Patent [19]
Malugani et al.

[11] Patent Number: 5,195,852
[45] Date of Patent: Mar. 23, 1993

[54] VACUUM PICK-UP NOZZLE WITH AIR BOOST MANIFOLD

[76] Inventors: Jack R. Malugani, 29619 Lilly Mt. La., Coarse Gold, Calif. 93614; Joseph Malugani, Jr., 1210 Coronet Way, Carson City, Nev. 89701; Harold L. Hull, 401 Canyon Way #43, Sparks, Nev. 89434

[21] Appl. No.: 793,801

[22] Filed: Nov. 18, 1991

[51] Int. Cl.⁵ .................. B65G 53/28; B65G 53/14; B65G 53/42; B60P 1/60
[52] U.S. Cl. .................. 406/153; 406/151; 406/92; 406/192; 406/93; 406/94; 406/39; 406/41
[58] Field of Search .................. 406/151-153, 406/93, 94, 39, 41, 194, 95, 192, 106, 92

[56] References Cited
U.S. PATENT DOCUMENTS

| | | | |
|---|---|---|---|
| 1,778,429 | 10/1930 | Morrow | 406/94 |
| 3,063,755 | 11/1962 | Wijdeveld et al. | 406/93 |
| 3,594,848 | 1/1969 | Atkinson | 15/314 |
| 3,973,802 | 8/1976 | Kwon et al. | 406/93 |
| 4,017,281 | 4/1977 | Johnstone | 55/334 |
| 4,097,092 | 6/1978 | Lapple | 406/93 |
| 4,200,950 | 5/1980 | Coverly | 15/314 |
| 4,904,126 | 2/1990 | Volth | 406/39 |
| 4,996,737 | 3/1991 | Madru, Sr. | 15/366 |

FOREIGN PATENT DOCUMENTS

| | | | |
|---|---|---|---|
| 1406647 | 6/1965 | France | 406/153 |
| 604090 | 4/1960 | Italy | 406/153 |
| 727901 | 12/1966 | Italy | 406/153 |
| 221023 | 9/1990 | Japan | 406/153 |
| 95789 | 5/1939 | Sweden | 406/153 |
| 1421644 | 9/1988 | U.S.S.R. | 406/153 |

Primary Examiner—Johnny D. Cherry
Assistant Examiner—James M. Kannofsky

[57] ABSTRACT

A manifold is disclosed which is adapted to be used with a system such as a truck mounted vacuum system and includes a nozzle which re-routes a portion of the exhaust air from the blower associated with the vacuum system back through the nozzle into the intake vacuum hose, thus creating a boost heretofore unavailable. A second embodiment teaches an insert to be used at a junction in the line to further increase the efficiency of the loading system.

14 Claims, 3 Drawing Sheets

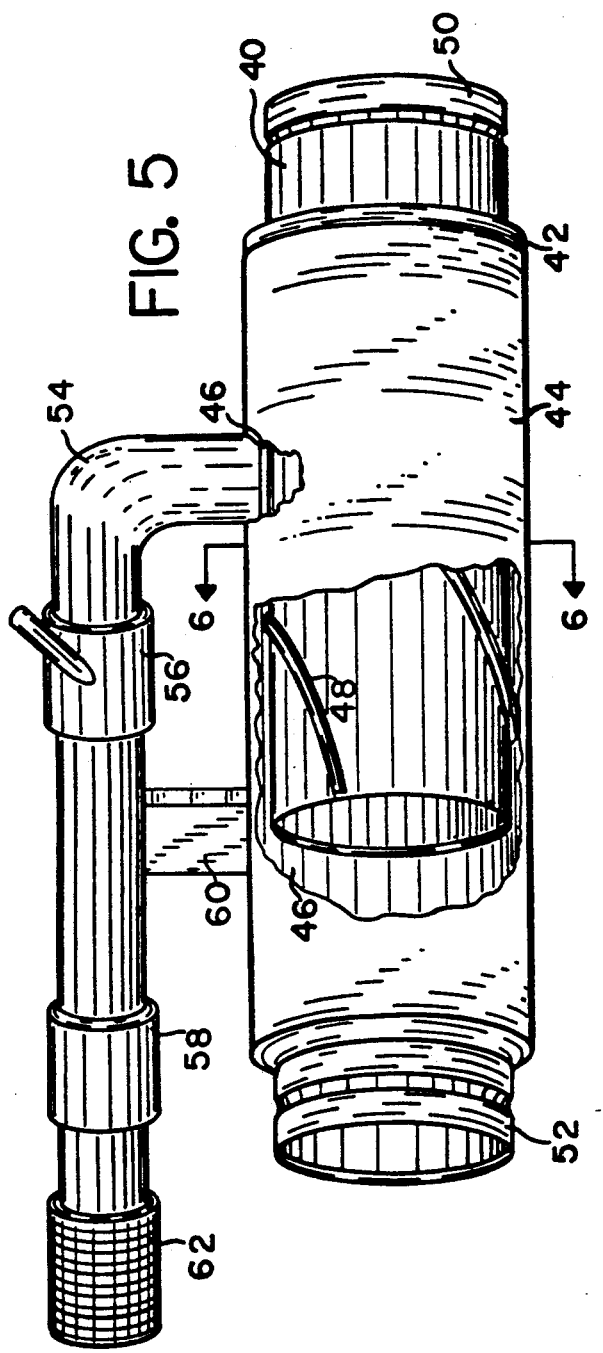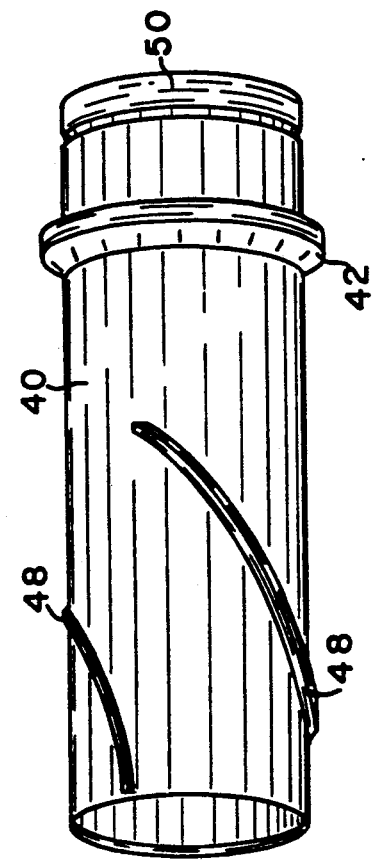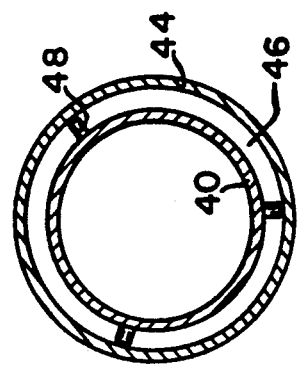

VACUUM PICK-UP NOZZLE WITH AIR BOOST MANIFOLD

FIELD OF THE INVENTION

This invention relates to vacuum pick-up systems and more particularly to the pick-up nozzle end of a vacuum hose such as used by industrial vacuum loaders associated with vacuum trucks.

BACKGROUND OF THE INVENTION

Industrial vacuum loaders are used to load particulate or granular material from piles, bins, trucks, railroad cars, rail or truck spills, ship holds, or the like and often times are truck mounted with the truck having its own vacuum producing system which evacuates the air in the hopper or transport tank mounted on the truck body. Or such systems may be stationarily mounted in a fixed location in an industrial plant, or on railroad cars or other vehicles. Some such industrial vacuum loaders employ a large enclosed hopper into which the particulate or granular material such as iron ore, cement, bauxite, alumina or other products such as grain, ashes, or other products too numerous to mention, is drawn through pipe sections or a flexible loading hose attached to the hopper inlet and means are provided to unload the hopper in the same manner or by dumping or tilting. Low pressure for suction purposes is maintained in the hopper generally by means of a relatively large engine-driven positive displacement rotary blower which has its suction port connected to an air outlet port on the hopper and its pressure port connected to atmosphere. To prevent dust, fines or other extremely small air suspended particles in the material being loaded from being drawn from the hopper and through the blower for discharge to the atmosphere, dust filtration means are often connected between the air outlet port in the hopper and the suction port on the blower.

The efficiency of such systems depend on a number of factors, such as the amount of suction created by the blower, the restriction of the filtration system, the size of the pick-up hose and nozzle, etc. Especially when the system is truck-mounted these factors play an important part in reflecting the time element involved as the loading time directly affects the cost of the truck and driver and it becomes cost effective to get the truck loaded by an efficient method in the least time possible. The blower system, when truck-mounted, is limited in size for practical reasons and when its efficiency is further limited by the filtration system, additional efficiency is difficult to improve on.

This invention addresses this efficiency problem by providing a means to boost the flow of materials in the pick-up hose by means other than just the vacuum in the hopper, thus reducing the loading time substantially.

SUMMARY OF THE INVENTION

The present invention addresses the fore-going problems by providing a manifold located at the nozzle end of the pick-up hose, the manifold being connected to the exhaust of the blower through a control valve and a separate hose, which allows some of the air being released into the atmosphere to be directed through the hose to the manifold, which in turn, directs the air stream into the pick-up hose which increases efficiency substantially.

Also, a manifold of basically the same design, but with hose connections at both ends may be inserted into the pick-up hose at various junction points along its length to again increase the efficiency.

It is therefore a primary object to provide an improved vacuum pick-up system with an increase in efficiency without increasing the size of the blower or changing the filtration system.

It is another object to provide a nozzle end which contains a manifold to direct input air up-stream in the pick-up hose.

Still another object is to provide control means to control the volume of air entering the manifold.

Another object is to provide an air hose with appropriate connections between the blower exhaust port and the manifold.

Still another object is to provide a control valve at substantially the blower exhaust port to control the amount of air into the atmosphere and to the manifold air supply line.

Yet another object is to provide suitable connections from the nozzle manifold to the pick-up hose and the air input hose.

Still another important object is to provide a replaceable liner in the nozzle made of material such as stainless steel.

Another object is to provide a one-way valve in the air input line substantially at the manifold end.

Still another object is to provide a shut-off control valve at substantially the manifold end of the air input line.

Another important object is to provide in a second embodiment a manifold with hose connections on both ends for the pick-up hose.

Still another object is to provide means in either the nozzle manifold or the manifold of the second embodiment to cause the air input to form a vortex or swirl for added efficiency.

Other advantages and objects will become apparent when taken into consideration with the following drawings and specifications.

BRIEF DESCRIPTION OF THE DRAWINGS

FIG. 5 is a perspective partial cutaway view of a second embodiment.

FIG. 6 is a section taken at 6—6 of FIG. 5.

FIG. 7 is a perspective view of the inner section of the second embodiment.

DETAILED DESCRIPTION OF THE DRAWINGS

Figure 1:
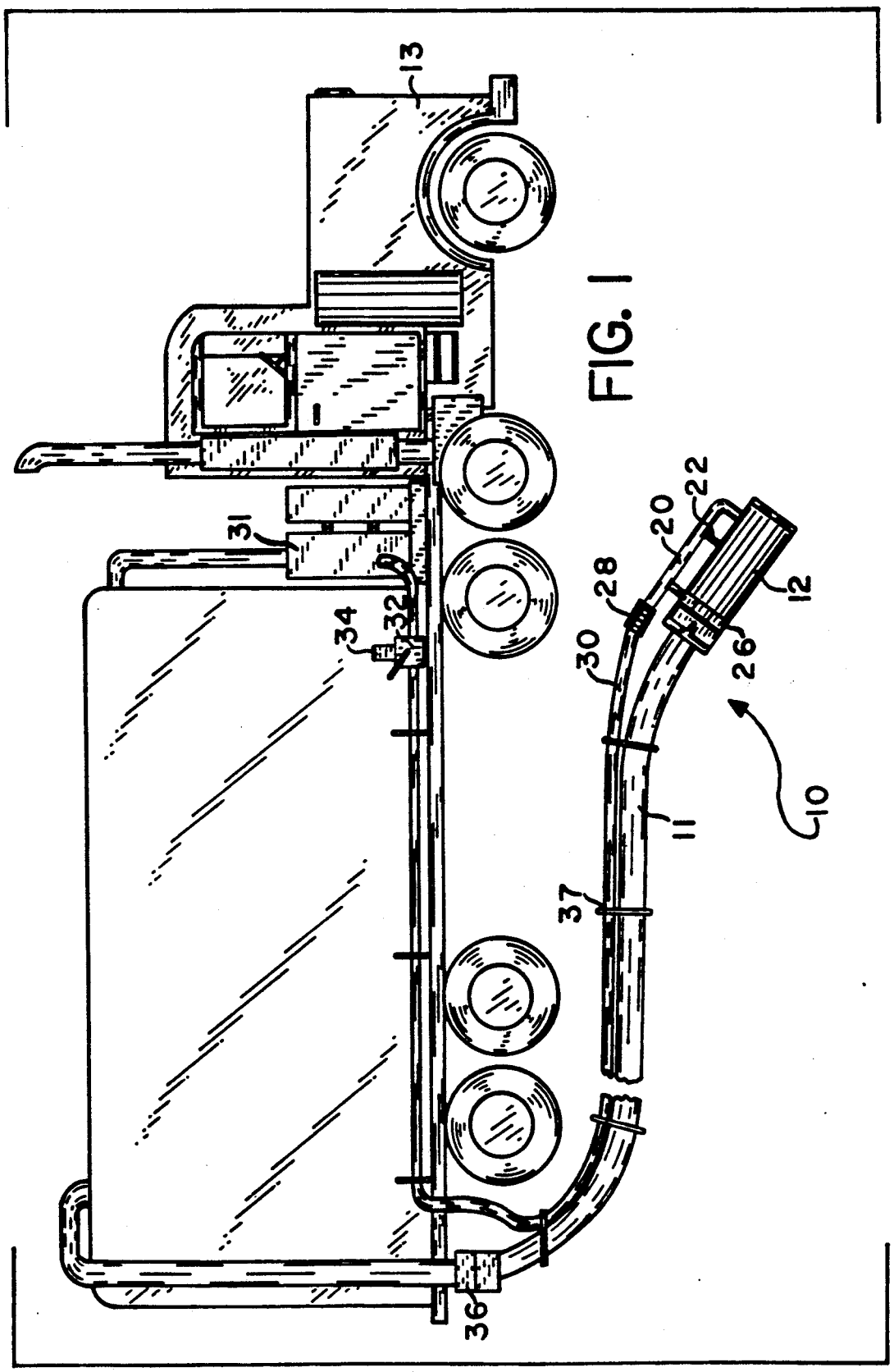
FIG. 1 is an over view of the nozzle as mounted on a pick-up hose of a typical vacuum truck.
Figure 2:
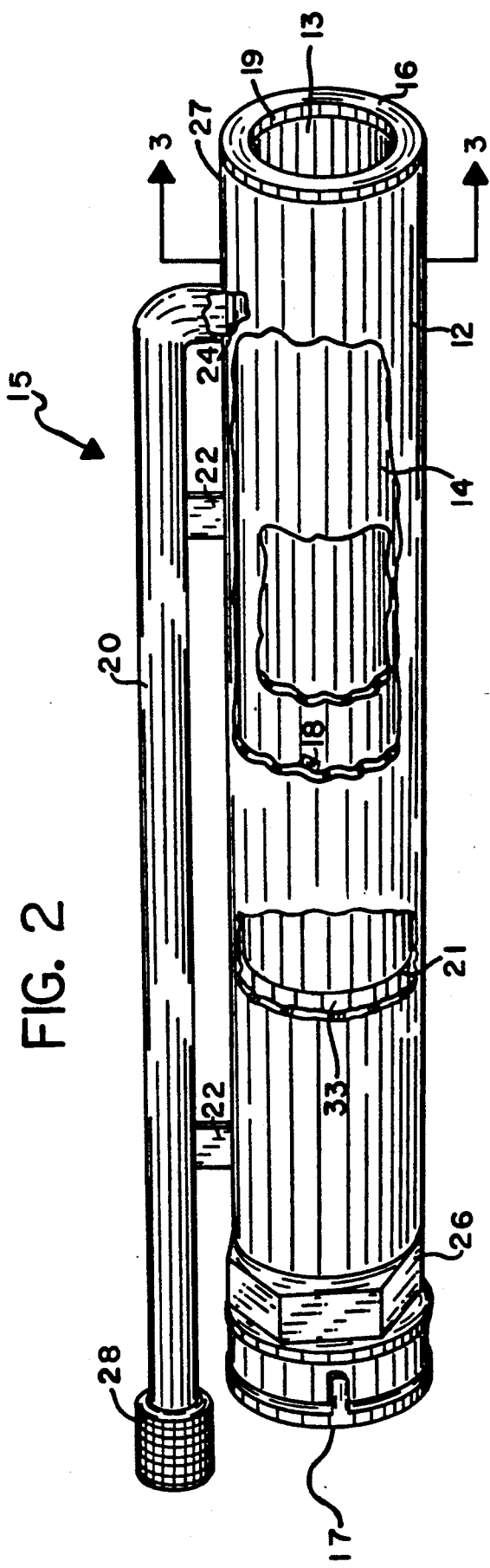
FIG. 2 is a perspective, partially cut-a-way view of the nozzle showing the inner and outer manifold construction.

Referring now to the drawings in detail wherein like characters refer to like elements throughout the various drawings, in FIGS. 1, 10 is an over-view of the present invention mounted on the end of a pick-up vacuum hose 11 of a typical vacuum truck 13 and in FIG. 2, arrow 15 designates a manifold with 12 being an outer cylinder forming a first substantially elongated tubular member having first and second ends 27 and 17 respectively, 14 being an inner cylinder forming a second substantially elongated tubular member having first and second ends 19 and 21 respectively, and its outer circumference 23 being smaller than the inner circumference 25 of first member 12, providing an air space 24 between cylinders 12 and 14 respectively, with 16 being a cap or ring secured by suitable means such as welding to close off the space 24 to outside atmosphere. 18 are suitable spacers between cylinders 12 and 14 respectively, with 20 being a third substantially tubular member such as an incoming air pipe suitably connected to cylinder 12 by means such as welding and suitably affixed to cylinder 12 by spacers 22 which may also be welded in place, while 26 is a suitable connection to the main truck vacuum hose 11 and 28 is a suitable air connection to air line 30 of vacuum truck 13. 32 is a control valve mounted in the air line which controls the amount of air to the manifold 15 and into the atmosphere at exhaust port 34, with 36 being suitable connectors in the vacuum hose 11 with 37 being suitable means to attach hoses 11 and 30 together such as hose clamps and 31 being a vacuum blower.

33 as shown in FIG. 2, is a mixing chamber which is formed between the end 21 of the second member 14 and the end 17 of the first member 12 and when compressed air is forced through the third member 20, through air gap 24 into chamber 33, and when the pick-up manifold 15 is activated by vacuum line 11, particulates (not shown) entering manifold 15 mix with the compressed air from the third member 20 in chamber 33 and the particulates are forced at an increased velocity through the vacuum line 11.

Figure 4:
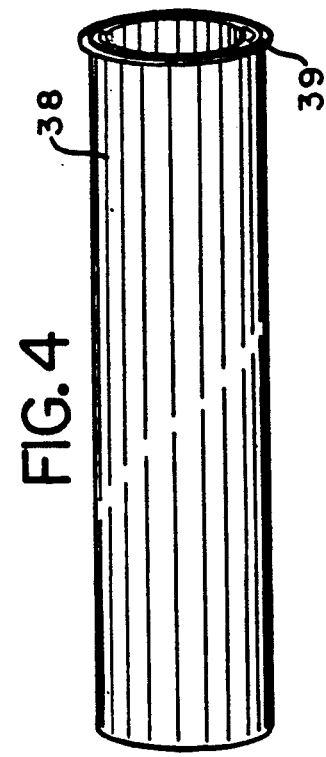
FIG. 4 is a replaceable sleeve or liner.
Figure 3:
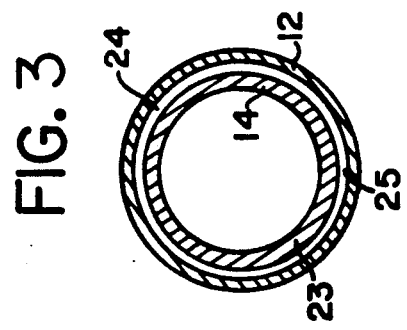
FIG. 3 is a section taken at 3—3 of FIG. 2.

FIG. 4 shows a replaceable sleeve 38, with lip 39, which may be inserted into the nozzle of the manifold 15 and which may be made of a substance such as stainless steel.

FIGS. 5, 6 and 7 show a second embodiment which may be placed in line in the truck vacuum hose 11 in any desired location to act as a booster and these may be "ganged" to provide a longer pick-up hose of great length, with 40 being an inner cylinder, with closure ring or cap 42 being suitable affixed between inner cylinder 40 and outer cylinder 44 which provides an air space 46. In this embodiment, the spacers 48 are multiple, spiral members which are suitably affixed to inner cylinder 40 by means such as welding which in operation causes the air to swirl or form a vortex thus increasing the efficiency. 50 and 52, respectively, are suitable connectors to connect this embodiment into the vacuum line 11 with 54 being an air input pipe with 56 being a control valve and 58 a one-way check valve such as a ball-check valve (interior not shown) and 60 being a mounting spacer suitably affixed such as by welding with 62 being a suitable air fitting.

It will now be seen that we have provided an improved vacuum pick-up system which may be adapted to a conventional vacuum truck or other stationary vacuum systems which increase the efficiency of the vacuum system by diverting a portion of the exhaust air normally going into the atmosphere back into the vacuum line either at the nozzle or at other in-line locations in the line.

It will also be noted that we have provided controls to control the amount of air going into the line and to the atmosphere with a ball-check valve to prevent backflow where necessary.

It will be seen that the manifolds may be fabricated from metal such as metal cylinders and pipes and suitably welded together to form manifolds that can economically be fabricated without special molds.

We have also provided a replaceable insert made from material such as stainless steel.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. A vacuum pick-up manifold adapted to be used in conjuction with a vacuum system comprising: a first substantially elongated tubular member having first and second ends, a second substantially elongated tubular member having first and second ends, said second member having its outer circumference smaller than the inner circumference of said first member, means to mount said second member to the interior of said first member providing an air gap between said first and second members, said second member being substantially shorter in its length than said first member, said first end of said first member terminating substantially flush with said first end of said second member, means to close said air gap between said first and second members at their first ends, said second end of said second member terminating on the interior of said first member leaving a chamber between said second end of said second member and said second end of said first member, a third substantially tubular member, said third member having means to be mounted to the exterior of said first member, said third member having first and second ends, said first end of said third member having means to attach to an air supply line, said second end of said third member communicating with said air gap between said first and second members at substantially their first ends, said second end of said first member having means to attach to a vacuum line, whereby, when compressed air is forced through said third member through said air gap into said chamber and when said vacuum pick-up manifold is activated by said vacuum line, particulates entering said manifold mix with said compressed air in said chamber and said particulates are forced at an increased velocity through said vacuum line.

2. The manifold of claim 1 in which said means to mount said second member on the interior of said first member providing an air gap, are multiple spacers of a thickness of substantially the thickness of said air gap, said spacers being suitably affixed to the exterior of said second member at substantially said second end of said second member.

3. The manifold of claim 1 in which means to mount said third member to the exterior of said first member is at least one spacer suitably affixed between said first and third members.

4. The manifold of claim 1 in which said means to close said air gap between said first and second members at their first ends is a welded ring.

5. The manifold of claim 1 including a replaceable insert, said insert being a substantially elongated tubular member, said insert having a first end and a second end, said insert being of a size and shape to cooperate with the interior circumference of said second member, said insert having a shoulder on said first end, said shoulder cooperating with said first ends of said first and second members to retain said insert in a fixed relationship with said second member.

6. The manifold of claim 1 in which said air supply line is suitably connected to the exhaust port of the vacuum blower associated with said vacuum system.

7. The manifold of claim 6 in which said air supply line includes a variable air control valve, said valve being capable of varying the amount of air released into the atmosphere and into said air supply line.

8. A vacuum booster manifold adapted to be used in conjunction with a vacuum system comprising: a first substantially elongated tubular member having first and second ends, a second substantially elongated tubular member having first and second ends, said second member having its outer circumference smaller than the inner circumference of said first member, means to mount said second member on the interior of said first member providing an air gap between said first and second members, said second member being substantially shorter in its length than said first member, said first end of said first member terminating short of said first end of said second member, said second end of said first member terminating in means to attach to a vacuum line, means to close said air gap between said first and second members at the first end of the first member, said first end of said second member terminating in means to attach to a vacuum line, said second end of said second member terminating on the interior of said first member leaving a chamber between said second end of said second member and said second end of said first member, a third substantially tubular member, said third member having means for mounting said third member to the exterior of said first member, said third member having first and second ends, said first end of said third member having means to attach to an air supply line, said second end of said third member communicating with said air gap between said first and second members, whereby, when compressed air is forced through said third member through said air gap into said chamber and when said vacuum booster manifold is activated by said vacuum line, particulates passing through said manifold mix with said compressed air in said chamber and said particulates are forced at an increased velocity through said vacuum line.

9. The manifold of claim 8 in which said means to mount said second member on the interior of said first member providing an air gap are multiple, elongated, spiral spacers of a thickness and width of substantially the thickness of said air gap and of a substantially spiral shape, said spacers being of a sufficient length to cause said particulates and said compressed air to form a vortex, and said spiral spacers being suitably affixed to the exterior of said second member.

10. The manifold of claim 8 in which said means to close said air gap between said first and second members is a welded ring.

11. The manifold of claim 8 in which said means for mounting said third member to the exterior of said first member is at least one spacer suitably affixed between said first and third members.

12. The manifold of claim 8 in which said third member includes a one-way ball-check valve.

13. The manifold of claim 8 in which said third member includes a shut-off valve.

14. A method of increasing the efficiency of a vacuum system comprising the steps of:
 a. attaching a manifold to an end of a pick-up hose of said vacuum system;
 b. attaching a variable air control valve to an exhaust port of a vacuum blower associated with said vacuum system, and varying the amount of air released to the atmosphere and to an air supply line attached to said valve at an end of said air supply line;
 c. attaching a distal end of said air supply line to said manifold; and
 d. adjusting the amount of air entering said manifold.

* * * * *